(12) United States Patent
Yu et al.

(10) Patent No.: US 6,785,416 B1
(45) Date of Patent: Aug. 31, 2004

(54) SYSTEM AND METHOD FOR THE PROCESSING OF SCANNED IMAGE DATA USING A PIXEL WINDOW

(75) Inventors: Shenbo Yu, Nashua, NH (US); Fred Andree, Brookline, MA (US); Steve Pratt, Acton, MA (US); Wei Zhang, Woburn, MA (US)

(73) Assignee: Oak Technology, Inc., Sunnyvale, CA (US)

( * ) Notice: Subject to any disclaimer, the term of this patent is extended or adjusted under 35 U.S.C. 154(b) by 591 days.

(21) Appl. No.: 09/690,658

(22) Filed: Oct. 17, 2000

(51) Int. Cl.[7] ............................. G06K 9/34; G06K 9/46
(52) U.S. Cl. ..................................... 382/176; 382/194
(58) Field of Search ................................ 382/173, 176, 382/180, 190, 192, 193, 194, 195, 181–185, 200, 206, 221, 229, 237, 276; 358/1.9, 3.03, 3.06, 3.09, 3.13, 3.14, 3.2

(56) References Cited

U.S. PATENT DOCUMENTS

| | | | | |
|---|---|---|---|---|
| 5,798,846 A | * | 8/1998 | Tretter | 382/262 |
| 5,956,157 A | * | 9/1999 | Tai | 358/3.24 |
| 5,987,221 A | * | 11/1999 | Bearss et al. | 358/1.9 |
| 6,449,396 B1 | * | 9/2002 | Loce et al. | 382/276 |
| 6,552,824 B2 | * | 4/2003 | Rombola et al. | 358/3.14 |
| 6,608,701 B1 | * | 8/2003 | Loce et al. | 358/3.09 |

* cited by examiner

Primary Examiner—Andrew W. Johns
Assistant Examiner—Amir Alavi
(74) Attorney, Agent, or Firm—Lahive & Cockfield, LLP

(57) ABSTRACT

The illustrated embodiment processes scanned image data with a resolution of 600 dpi or higher. Image detection algorithms are used to detect the probable presence of halftone image data, large text image data, small text image data and photographic image data. The image detection algorithms are designed specifically for the amount of data contained in an image with a resolution of 600 dpi or greater. Once an image has been analyzed, the illustrated embodiment provides the correspondingly appropriate image process to the scanned image.

36 Claims, 17 Drawing Sheets

Figure 4

| -8 | -7 | -5 | -7 | -5 | -7 | -8 |
|---|---|---|---|---|---|---|
| -7 | -40 | -112 | 10 | -112 | -40 | -7 |
| -5 | -112 | 360 | 8 | 360 | -112 | -5 |
| -7 | 10 | 8 | 724 | 8 | 10 | -7 |
| -5 | -112 | 360 | 8 | 360 | -112 | -5 |
| -7 | -40 | -112 | 10 | -112 | -40 | -7 |
| -8 | -7 | -5 | -7 | -5 | -7 | -8 |

| A1 | A2 | A3 | A4 | A5 | A6 | A7 |
|----|----|----|----|----|----|----|
| B1 | B2 | B3 | B4 | B5 | B6 | B7 |
| C1 | C2 | C3 | C4 | C5 | C6 | C7 |
| D1 | D2 | D3 | D4 | D5 | D6 | D7 |
| E1 | E2 | E3 | E4 | E5 | E6 | E7 |
| F1 | F2 | F3 | F4 | F5 | F6 | F7 |
| G1 | G2 | G3 | G4 | G5 | G6 | G7 |

|  |  |  |  |  |  |  |
|---|---|---|---|---|---|---|
| A1 | A2 | A3 | A4 | A5 | A6 | A7 |
| B1 | B2 | B3 | B4 | B5 | B6 | B7 |
| C1 | C2 | C3 | C4 | C5 | C6 | C7 |
| D1 | D2 | D3 | D4 | D5 | D6 | D7 |
| E1 | E2 | E3 | E4 | E5 | E6 | E7 |
| F1 | F2 | F3 | F4 | F5 | F6 | F7 |
| G1 | G2 | G3 | G4 | G5 | G6 | G7 |

Figure 7A

|     |     |     | 50  |     |     |     |
| --- | --- | --- | --- | --- | --- | --- |
| A1  | A2  | A3  | A4  | A5  | A6  | A7  |
| B1  | B2  | B3  | B4  | B5  | B6  | B7  |
| C1  | C2  | C3  | C4  | C5  | C6  | C7  |
| D1  | D2  | D3  | D4  | D5  | D6  | D7  |
| E1  | E2  | E3  | E4  | E5  | E6  | E7  |
| F1  | F2  | F3  | F4  | F5  | F6  | F7  |
| G1  | G2  | G3  | G4  | G5  | G6  | G7  |

Figure 8A

| A1 | A2 | A3 | A4 | A5 | A6 | A7 |
|----|----|----|----|----|----|----|
| B1 | B2 | B3 | B4 | B5 | B6 | B7 |
| C1 | C2 | C3 | C4 | C5 | C6 | C7 |
| D1 | D2 | D3 | D4 | D5 | D6 | D7 |
| E1 | E2 | E3 | E4 | E5 | E6 | E7 |
| F1 | F2 | F3 | F4 | F5 | F6 | F7 |
| G1 | G2 | G3 | G4 | G5 | G6 | G7 |

|     |     |     | 50  |     |     |     |
| --- | --- | --- | --- | --- | --- | --- |
| A1  | A2  | A3  | A4  | A5  | A6  | A7  |
| B1  | B2  | B3  | B4  | B5  | B6  | B7  |
| C1  | C2  | C3  | C4  | C5  | C6  | C7  |
| D1  | D2  | D3  | D4  | D5  | D6  | D7  |
| E1  | E2  | E3  | E4  | E5  | E6  | E7  |
| F1  | F2  | F3  | F4  | F5  | F6  | F7  |
| G1  | G2  | G3  | G4  | G5  | G6  | G7  |

Figure 9B

|    |    |    |    |    |    |    |
|----|----|----|----|----|----|----|
| A1 | A2 | A3 | A4 | A5 | A6 | A7 |
| B1 | B2 | B3 | B4 | B5 | B6 | B7 |
| C1 | C2 | C3 | C4 | C5 | C6 | C7 |
| D1 | D2 | D3 | D4 | D5 | D6 | D7 |
| E1 | E2 | E3 | E4 | E5 | E6 | E7 |
| F1 | F2 | F3 | F4 | F5 | F6 | F7 |
| G1 | G2 | G3 | G4 | G5 | G6 | G7 |

50

SYSTEM AND METHOD FOR THE PROCESSING OF SCANNED IMAGE DATA USING A PIXEL WINDOW

TECHNICAL FIELD

This invention relates generally to the processing of scanned electronic image data. More particularly, this invention relates to the processing of scanned image data with a higher resolution than conventionally scanned image data.

BACKGROUND OF THE INVENTION

A pixel ("picture element") is the smallest logical unit of a graphical image. Each pixel corresponds to a single region of the image. The color of each pixel is encoded by a value. The number of bits used in the encoding is dictated by how many colors may be encoded with a full color encoding or how many shades of gray may be encoded with a grey scale encoding. For example, an eight bit value accommodates the encoding of $2^8$ colors. For color pixels, the value for a pixel may be an intensity value, having three components corresponding to intensity values for red, green and blue, respectively. These three colors are used additively to create other colors. In the well known red, green, blue (RGB) encoding scheme, the other colors are encoded as combinations of red, green and blue components having associated intensities. The encoding is represented in the following format (red intensity, green intensity, blue intensity) as a triplet. For example, the triplet (0, 192, 192) represents the color cyan, while the triplet (255, 0, 0) represents the color red.

The number of pixels in an image depends upon the resolution of the image. Resolution is typically measured in terms of pixels or "dots" per inch (dpi). As technology has advanced, the industry standard for the resolution of electronic devices that display images has increased from 300 dpi to 600 dpi. Thus, the general trend has been towards increasing the resolution of display devices.

Scanners scan hard copies of images and digitize the images. The result of scanning an image is a digital representation of image where the image is represented as a sequence of pixels having associated color values. The processing of scanned image data requires differentiation among the different types of data that may be scanned. Varieties of data include halftone image regions, text image regions and photographic image regions in the data. Halftone image regions are produced by the process of halftoning, which creates new colors and shades by varying the patterns of dots/shapes making up the image.

Text image regions are regions that contain text, and photographic image regions are regions containing photographs. Halftone printing uses a grid of uniform squares with black or colored dots/shapes inside each square. By varying the amount of the square in the grid that is filled in by the dot/shape and therefore, the amount of the square that is left white, an illusion of continuous variations of gray or color tones is created. The effect occurs because the human eye averages features which are not clearly seen as distinct from surrounding objects. Images commonly found in newspapers are created using this method.

When a scanner scans a printed halftone image, the scanner scans the dot/shape patterns that were used to print the halftone image. The halftone dots/shapes that were scanned by the optical scanner may result in interference patterns known as "moiré" appearing in the scanned image. The moiré patterns result in a checkered, banded or dotted appearance. Consequently, when a halftone image is scanned, a process known as smoothing or descreening is used to reduce the transfer of moiré patterns into the resulting scanned image file. Text image regions correspond to places where text appeared in the original document and need "sharpening." Sharpening accentuates the difference between an edge of text and the white space next to the text. The accentuation is done by making dark areas darker and white areas whiter. Photographic image regions need to be not modified or smoothed or sharpened. Electronic devices performing end processing of scanned image data, such as a high end copier, must be able to differentiate among different types of image regions. Failure to accurately distinguish among different types of image regions leads to inferior image quality due to the wrong type of processing being applied to an image region.

Segmentation classifies the scanned image data on a pixel by pixel basis (e.g. classifies as a halftone region, a text image region or a photographic image region. Segmentation has been developed to identify image regions for 300 dpi images. However, conventional segmentation techniques for 300 dpi images are not readily adaptable for 600 dpi images. The amount of data in the 600 dpi images is much greater than the amount of data found in 300 dpi images. For example, the 5×5 segmentation window currently used by copiers during the processing of 300 dpi images has to be increased to a 9×9 window to encompass the same amount of data included with the 600 dpi images. The associated computational costs of scaling the current algorithms in use for 300 dpi image processing to work with 600 dpi images is significant.

SUMMARY OF THE INVENTION

The present invention addresses the shortcomings of applying conventional 300 dpi image detection algorithms to scanned images with resolutions of 600 dpi or higher. The illustrated embodiment of the present invention uses image detection algorithms designed specifically for the amount of data contained in an image with a resolution of 600 dpi or greater. The present invention distinguishes between halftone image areas, large text image areas, small text image areas and photographic image areas and then applies appropriate image processing to each area.

In one embodiment of the present invention, scanned images with a resolution of at least 600 dpi are analyzed by an image detection algorithm designed to detect the probable presence of halftone image data and large text image data. A pixel window is used by the image detection algorithm to help perform calculations on the pixel values of each pixel in the image data. An individual pixel (the focus pixel) is analyzed in the context of the surrounding image area in order to determine if the image area fits a pattern displayed by halftone image areas or large text image areas. Appropriate image processing is then applied to the image based on the result.

In another embodiment of the present invention, scanned images with a resolution of at least 600 dpi are analyzed by an image detection algorithm designed to detect the probable presence of small text image data. A pixel window is used by the image detection algorithm to help perform calculations on the pixel values of each pixel in the image data. An individual pixel (the focus pixel) is analyzed in the context of the surrounding image area in order to determine if the image area fits a pattern displayed by small text image areas. Appropriate image processing is then applied to the image based on the result.

In yet another embodiment of the present invention, scanned images with a resolution of at least 600 dpi are analyzed by an image detection algorithm designed to detect the probable presence of the text characters '=' and 'x'. A pixel window is used by the image detection algorithm to help perform calculations on the pixel values of each pixel in the image data. An individual pixel (the focus pixel) is analyzed in the context of the surrounding image area in order to determine if the image area matches a pattern displayed by the text character '=' or if the image area matches a pattern displayed by the text character 'x'. Appropriate image processing is then applied to the image based on the result.

In yet another embodiment of the present invention, scanned images with a resolution of at least 600 dpi are analyzed by an image detection algorithm designed to detect the probable presence of the text character '='. A pixel window is used by the image detection algorithm to help perform calculations on the pixel values of each pixel in the image data. An individual pixel (the focus pixel) is analyzed in the context of the surrounding image area in order to determine if the image area matches a pattern displayed by the text character '='. Appropriate image processing is then applied to the image based on the result.

In a different embodiment of the present invention, scanned images with a resolution of at least 600 dpi are analyzed by an image detection algorithm designed to detect the probable presence of photographic image data. A pixel window is used by the image detection algorithm to help perform calculations on the pixel values of each pixel in the image data. An individual pixel (the focus pixel) is analyzed in the context of the surrounding image area in order to determine if the image area matches a pattern displayed by photographic image data. Appropriate image processing is then applied to the image based on the result.

In a preferred embodiment of the present invention, scanned images with a resolution of 600 dpi are analyzed by image detection algorithms designed to detect the probable presence of halftone image data, large text image data, small text image data and photographic image data. A pixel window is used by the image detection algorithm to help perform calculations on the pixel values of each pixel in the image data. An individual pixel (the focus pixel) is analyzed in the context of the surrounding image area in order to determine if the image area matches a pattern displayed by halftone image data, large text image data, small text image data, or photographic image data. Appropriate image processing is then applied to the image.

BRIEF DESCRIPTION OF THE DRAWINGS

FIG. 4 is a block diagram depicting an auto-filter utilized by the illustrative embodiment.

FIG. 5 is a block diagram of the 7×7 pixel window utilized by the illustrative embodiment to segment image data.

FIG. 6A is a block diagram of the 7×7 pixel window of FIG. 5 divided into four regions by a first detection algorithm.

FIG. 7A is a block diagram of the 7×7 pixel window of FIG. 5 depicting the comparison pixels of a second detection algorithm.

FIG. 8A is a block diagram of the 7×7 pixel window of FIG. 5 depicting the comparison pixels of a third detection algorithm.

FIG. 9A is a block diagram of the 7×7 pixel window of FIG. 5 depicting the comparison pixels of a fourth detection algorithm.

FIG. 9B is a block diagram of the 7×7 pixel window of FIG. 5 depicting further the comparison pixels of a fourth detection algorithm.

DETAILED DESCRIPTION OF THE INVENTION

The illustrative embodiment of the present invention provides a method to process scanned image data with a higher resolution, such as 600 dpi. The illustrative embodiment performs a number of detection algorithms for detecting types of image regions and other characteristics of the image data. The detection algorithms of the illustrative embodiment can detect halftone image regions, large and small text image regions, and photographic image regions while processing scanned images with a higher resolution (e.g. 600 dpi).

Figure 1:
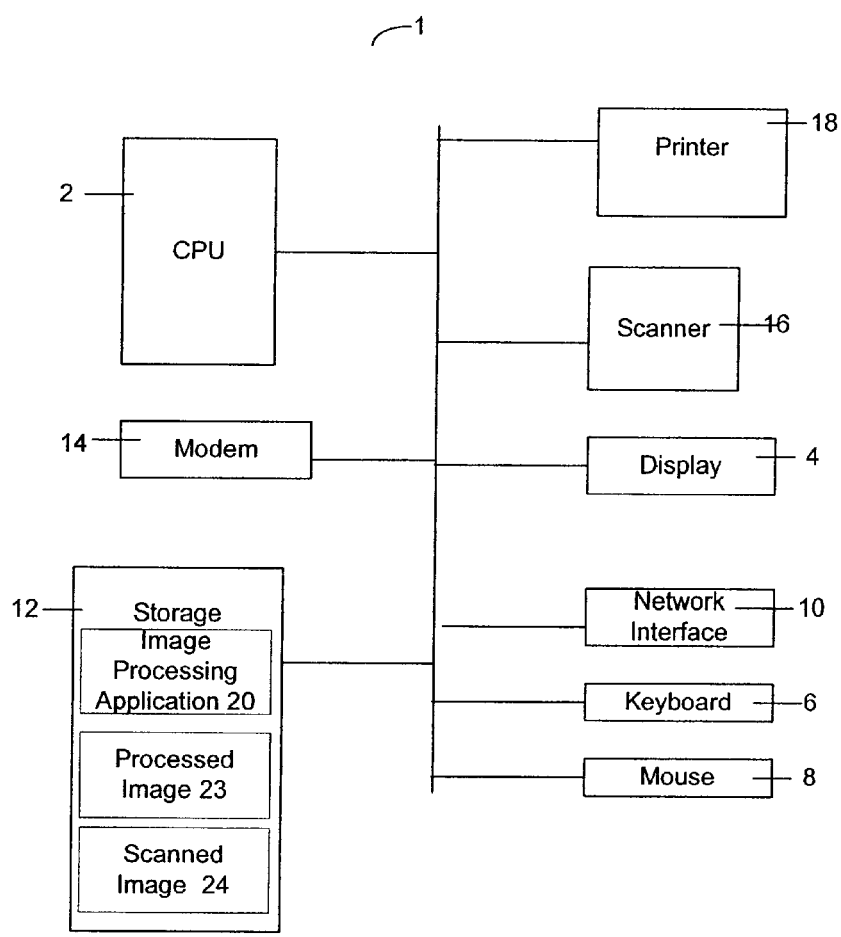
FIG. 1 depicts a block diagram of an electronic device suitable for practicing the illustrative embodiment of the present invention in a local computer network

FIG. 1 depicts an environment suitable for practicing the illustrative embodiment of the present invention. The environment includes an electronic device 1 with a CPU 2, a display 4, keyboard 6, a mouse 8, and a network interface 10, such as a network adapter for interfacing with a computer network. The electronic device 1 also includes storage 12 and an attached scanner 16. A modem 14 may be provided for facilitating communication with a remote computing resource. The storage 12 holds an image processing application 20 that is run by the CPU 2. The electronic device may include a printer 18 for printing print jobs. The present invention encompasses a multitude of electronic devices that process scanned image data including but not limited to a fax machine, multifunction office machine, printer, copier, etc.

The electronic device 1 shown in FIG. 1 is responsible for receiving a scanned image 24. The scanned image is shown as being stored in the storage 12 in FIG. 1. Those skilled in the art will appreciate that the storage may take many forms including that of primary storage or secondary storage. For illustrative purposes of the discussion below, it is presumed that the scanned image 24 is a 600 dpi image. The electronic device 1 executes the image processing application 20 on the CPU 2 to produce a processed image 23. The processing may include segmentation and other processes that are performed on the image so as to appropriately render the image on an output device, such as the video display 4 or the printer 18.

Figure 2:
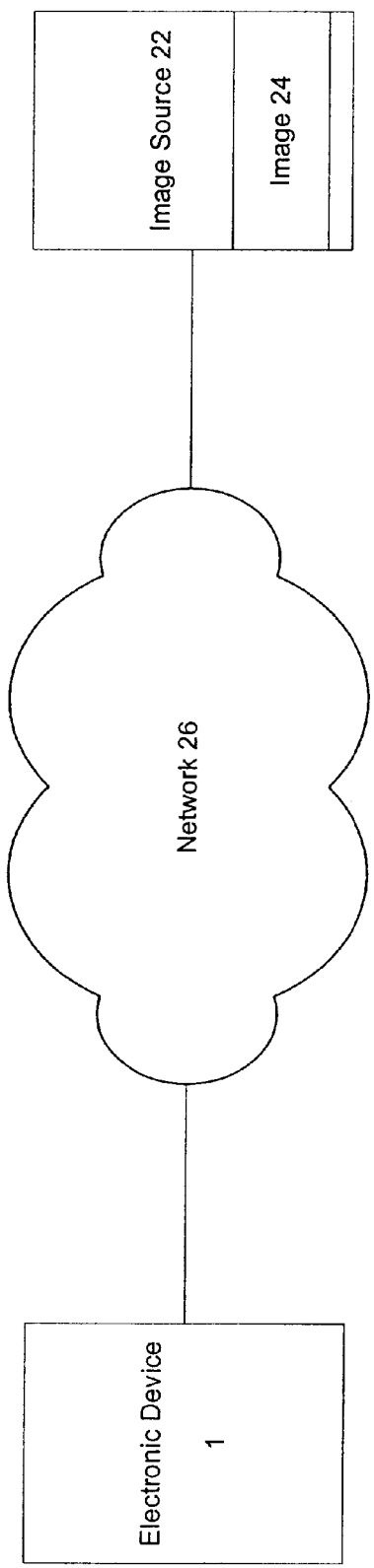
FIG. 2 depicts a block diagram of an environment that is suitable for practicing the illustrative embodiment of the present invention.

FIG. 2 depicts an instance wherein the source of the image 24 is not local but rather is remote. As depicted in FIG. 2, an image source 22 provides the image 24 over a network 26 to the electronic device 1. The image source may be another computer, a copier or other scanning device. The network 26 may be a communications network, a local area network, a wide area network or other type of known network. In some embodiment, the network 26 may be the Internet or another network that supports the TCP/IP protocol suite. In the case depicted in FIG. 2, the input image 24 is received over the network 26 by the electronic device 1 and processed at the electronic device. The electronic device may output the processed image locally or may return it to the image source 22 or to an alternative destination.

Those skilled in the art will recognize that there are a multitude of possible network connections and configurations and the present invention is not dependent on any one set of hardware or any particular network configuration for practicing the present invention for its successful functioning, nor is the present invention restricted in scope to the use of the illustrated copier.

Figure 3:
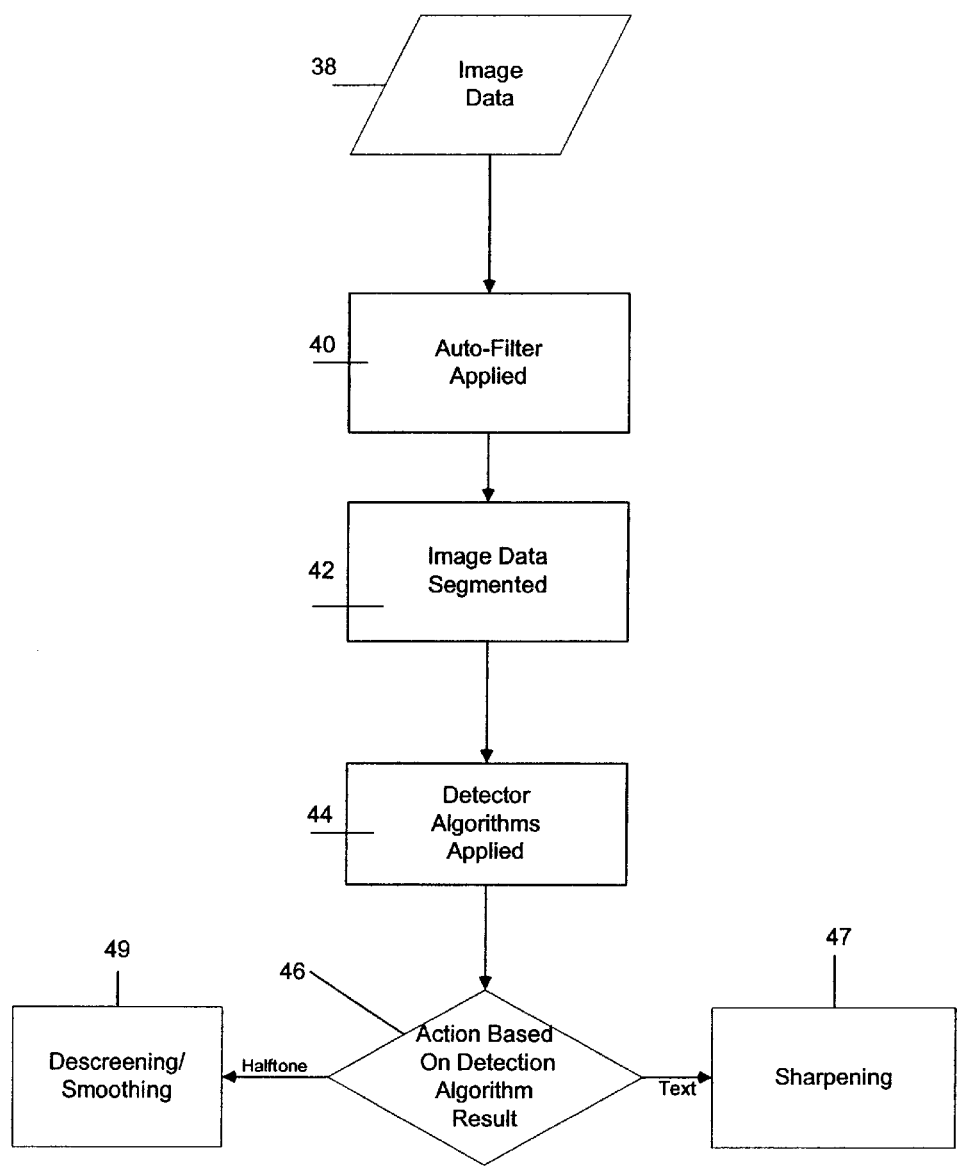
FIG. 3 is a flow chart overview of steps performed in the method of the illustrative embodiment of the present invention.

The illustrative embodiment of the present invention processes the 600 dpi input image to perform segmentation and other detection analysis. The steps involved in processing the image data are depicted in FIG. 3. The method of the present invention begins with the image data 38 which has been received from a scanner or other image source having an auto-filter applied to the image data (step 40). The auto-filter smoothes halftone data and sharpens text data. FIG. 4 depicts a filter matrix for a suitable auto-filter 48. As can be seen in FIG. 3, the auto-filter 48 in the illustrative embodiment is a 7×7 window 48 of numeric values overlaying a 7×7 pixel window 50 used by the invention's detection algorithms. Each numeric value in the auto-filter corresponds to a position of a pixel intensity value in the underlying 7×7 pixel window that is being used to segment the image. The numerical values in the auto-filter 48 are multiplied by the underlying pixel value in the 7×7 pixel window 50 and the products are assigned as the new values for the pixel intensities in the underlying 7×7 pixel window. Those new values are then used by the detection algorithms as the image region surrounding pixels in the image are evaluated. Those skilled in the art will realize that both the auto-filter and the pixel window do not have to be 7 pixel by 7 pixels in dimension. Adjustments in the size of the auto-filter and pixel window are possible as long as the detection algorithms are correspondingly adjusted.

After the application of the auto-filter (step 40), the filtered image data is segmented (step 42) and detection algorithms designed specifically for image data with a resolution of 600 dpi are executed (step 44). Those skilled in the art will appreciate that where higher than 600 dpi resolution image is being processed, different detection algorithms may be used. The various detection algorithms, will be described in more detail below. The results of the detection algorithms are evaluated and pre-defined actions are taken (step 46). In the event the detection algorithms indicate the presence of text data, the pre-defined action is that the text image is sharpened (step 47). The sharpening accentuates the difference between the edge of the text and the white space next to the edge. The dark areas are made darker and the white areas are made whiter. In the event the detection algorithms indicate the presence of halftone image data, the pre-defined action is that halftone image data is smoothed (step 49). Smoothing or descreening is necessary in order to reduce the transfer of moire patterns into a scanned image file. In the event the detection algorithms output indicate the presence of photographic image data, the present invention leaves the photographic image data alone.

The illustrative embodiment of the present invention accomplishes pixel examination through the use of a 7×7 pixel window 50, such as depicted in FIG. 5. The 7×7 pixel window 50 includes rows A through G and columns 1 through 7. In the illustrative embodiment, each pixel in the scanned image is individually examined by centering the D4 coordinate of the 7×7 pixel window 50 on the pixel. The D4 pixel is then examined in relation to the other pixel values in the 7×7 pixel window 50. After each pixel is examined, the pixel window 50 is moved over by one pixel, and the process is repeated. Those skilled in the art will appreciate that while the illustrated embodiments depicted herein focus on each pixel in the image data by centering the pixel window an equal distance around the focus pixel, alternative placements of the "focus pixel" within the pixel window are possible within the scope of the present invention as long as the image detection algorithms are adjusted accordingly.

The illustrative embodiment of the present invention includes a first detection algorithm that splits the 7×7 pixel window 50 used to segment image data into four quadrants 54, 56, 58 and 60 surrounding the center pixel D4, as depicted in FIG. 6A. The 7×7 pixel window 50 is carved into a Left Up window 54, a Left Down window 56, a Right Up window 58 and a Right Down window 60. In the illustrated embodiment, the Left Up 54 and Right Down 60 quadrants are three pixels wide by four pixels tall while the Right Up 58 and Left Down 56 quadrants are four pixels wide and three pixels tall. All four quadrants consist of twelve pixels, which when combined with the center pixel D4 being examined, account for all forty-nine pixels of the 7×7 pixel window 50. Those skilled in the art will realize that the orientation of the quadrants can be changed without inhibiting the effectiveness of the present invention as long as the detection algorithms are correspondingly adjusted to take into account the quadrant orientation changes.

Figure 6B:
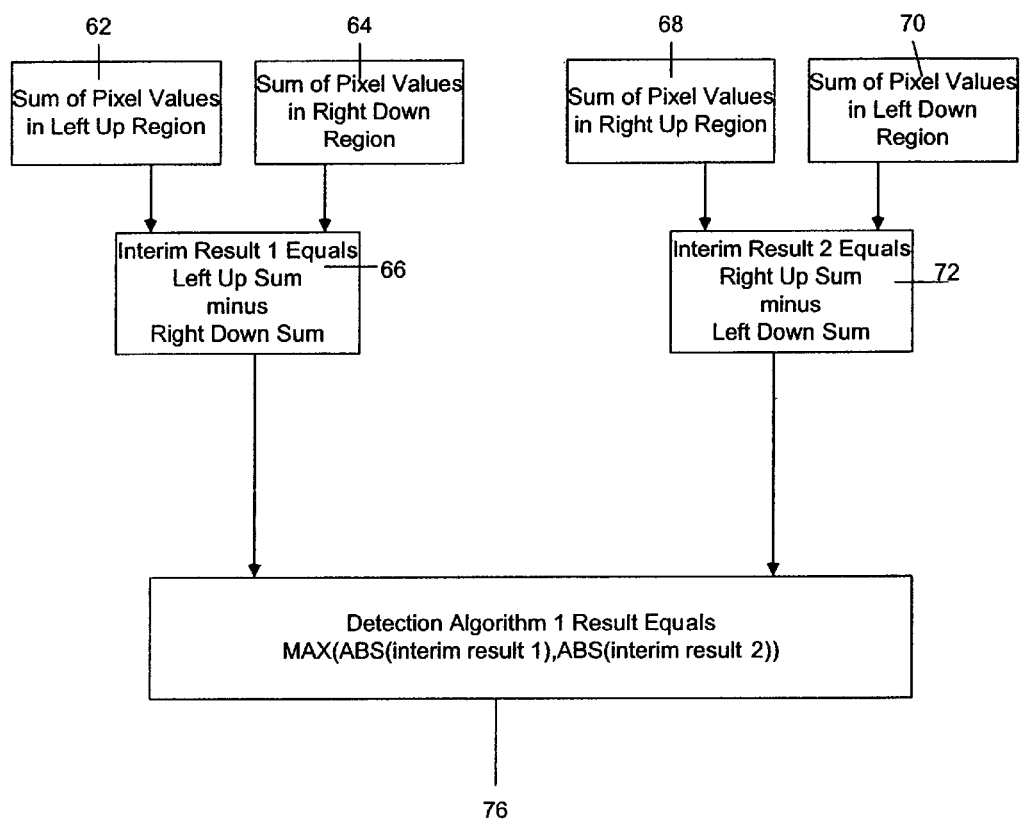
FIG. 6B is a flow chart of the steps performed by the first detection algorithm.

The illustrative embodiment of the present invention uses different detection algorithms to distinguish between different types of image data. FIG. 6B depicts the steps performed by a first detection algorithm for determining whether an mage region is likely a halftone image region or a large text region. The first detection algorithm compares pixel values between diagonally positioned quadrants. The detection algorithm first sums the pixel values of the Left Up quadrant 54 (step 62). The detection algorithm then sums the pixel values of the Right Down quadrant 60 (step 64) and subtracts the sum of the values in the Right Down quadrant from the sum of values of the Left Up quadrant to establish a first interim result (step 66). Analogously, the first detection algorithm sums the pixel values of the Right Up quadrant 58 (step 68), sums the pixel values of the Left Down quadrant 56 (step 70), and subtracts the sum of the values in the Left Down quadrant from the sum of values of the Right Up quadrant to establish a second interim result (step 72). The first detection algorithm compares the absolute values of both interim results and adopts the larger of the two values as the first detection algorithm result (step 76). If the algorithm value is close to zero, halftone image data is likely present, while if the value is large, a large text region is likely present. Those skilled in the art will recognize that the order of preliminary steps taken by the detection algorithm of the illustrated embodiment of the present invention may be changed without affecting the numbers being compared in the intermediate steps.

Figure 7B:
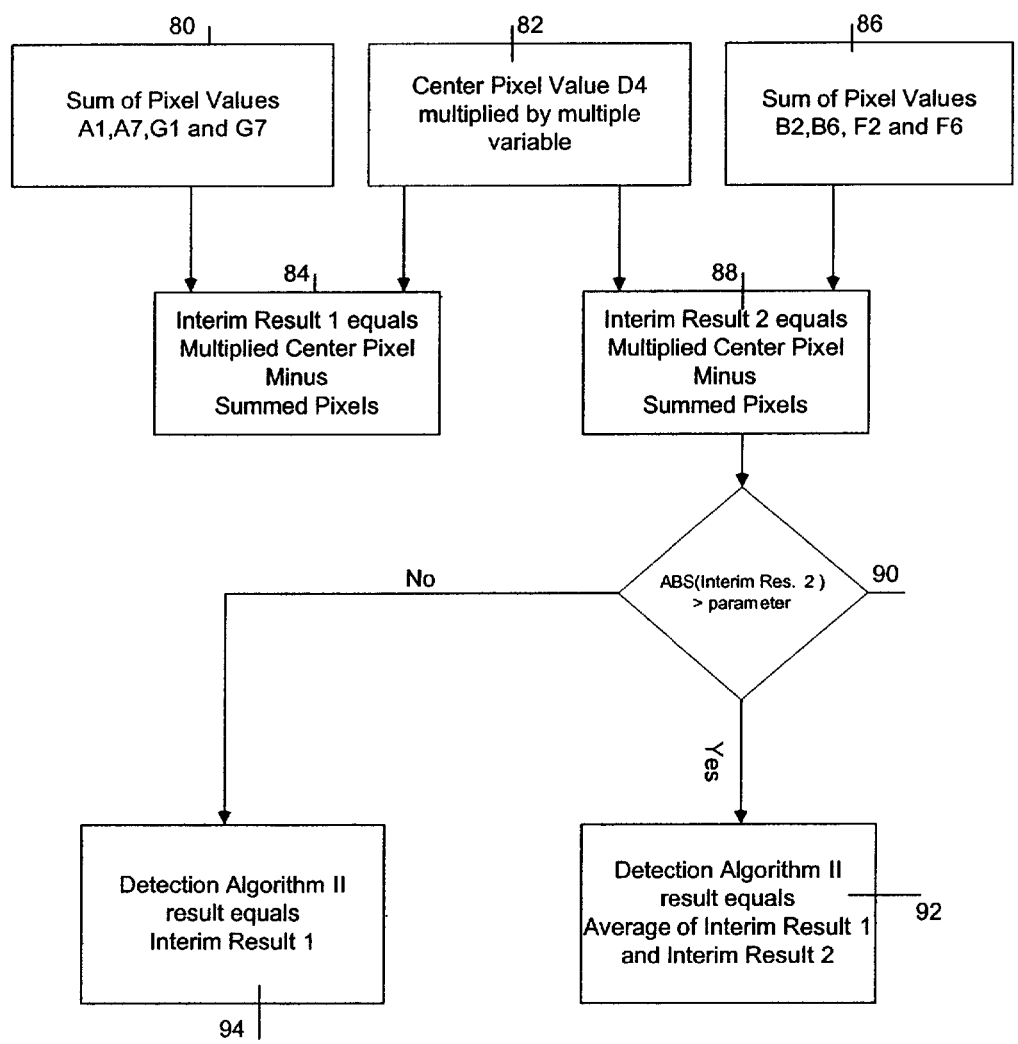
FIG. 7B is a flow chart of the steps performed by the second detection algorithm.

The illustrative embodiment of the present invention utilizes a second detection algorithm to detect the probability of small text image regions (as opposed to "large" text regions) which are made up of text data with a small font size. FIG. 7A depicts a 7×7 pixel window 50 denoting the pixel values utilized by the second detection algorithm. FIG. 7B illustrates the steps performed by the second detection algorithm. The pixel values of the four corners of the 7×7 pixel window 50 (i.e., A1,A7,G1 and G7) are added together (step 80). The value of the center pixel in the window, D4, is then multiplied by a variable (step 82). The value of the variable may be empirically derived. The summed corner values are subtracted from the multiplied center pixel value to establish a first interim result (step 84). The algorithm's next step is to sum the four corners of a virtual 5×5 window overlaid on the 7×7 pixel window 50, with the corner pixels being B2, B6, F2, and F6 (step 86), the value of the center pixel in the window, D4, is then multiplied by a variable (step 82). The summed pixel values (step 86) are then subtracted from the multiplied center pixel value (step 82) to reach a second interim result (step 88). The next step is to compare the absolute value of the second interim result with a pre-defined parameter value (step 90). The parameter value is based on a study of the distribution of intensity values in a small text image region. If the absolute value of the second interim result (step 88) is greater than the parameter, then the second detection algorithm will assign the average of the first interim result (step 84) and second interim result as the final result (step 92). If the absolute value of the second interim result is less than or equal to the parameter (step 90) then the second detection algorithm is assigned the value of the first interim result (step 94).

Figure 8B:
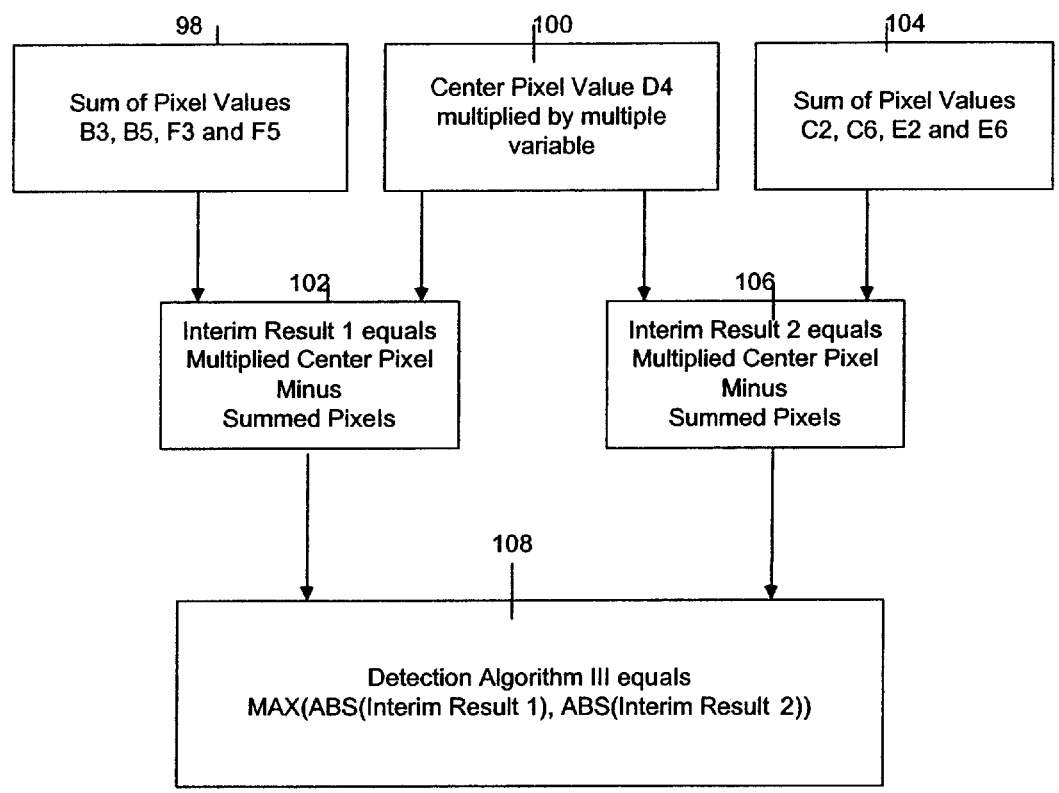
FIG. 8B is a flow chart of the steps performed by the third detection algorithm.

The illustrative embodiment also contains both third and fourth complementary edge detection algorithms whose functions are to check for specific text characters that other detection algorithms may miss. The third algorithm utilized by the illustrative embodiment of the present invention is necessary because the first two algorithms used alone occasionally mistake thin "x" lines and "=" lines for halftone image data. FIG. 8A depicts a 7×7 pixel window 50 which denotes the pixels being utilized in the third detection algorithm. FIG. 8B illustrates the steps followed by the third detection algorithm. The algorithm first sums the pixel values of the B3, B5, F3 and F5 pixel positions (step 98). Next the center pixel value D4 is multiplied by a variable (step 100) and the summed pixel values (step 98) are subtracted from the multiplied center pixel value in order to reach a first interim result (step 102). The pixel values C2,C6, E2 and E6 are summed (step 104) and the result is subtracted from the multiplied center pixel value (step 100) to reach a second interim result (step 106). The absolute values of the two interim results (step 102 and step 106) are compared, and the final result of the third detection algorithm is set equal to the larger of the two absolute values (step 108).

Figure 9C:
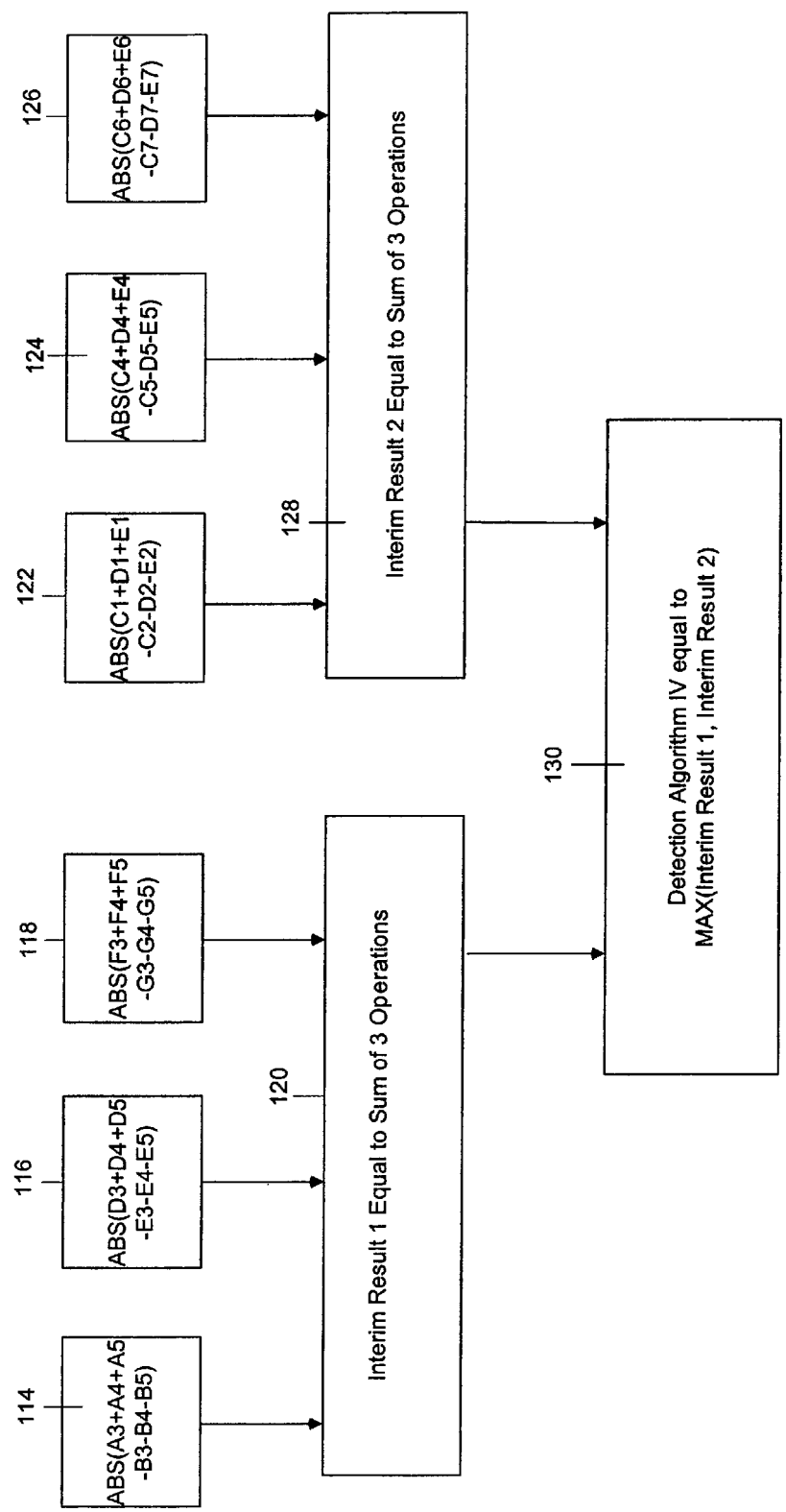
FIG. 9C is a flow chart of the steps performed by the fourth detection algorithm in the illustrative embodiment of the present invention.

The illustrative embodiment of the present invention utilizes a fourth detection algorithm to search for the character "=", which is often found in Kanji text and resolution test targets. FIG. 9A depicts a 7×7 pixel window 50 which denotes the pixels used in the first part of a fourth detection algorithm. FIG. 9B depicts a 7×7 pixel window 50 which denotes the pixels being utilized in the second part of a fourth detection algorithm. FIG. 9C illustrates the steps followed by the fourth detection algorithm. The first step of the first part of the fourth detection algorithm involves vertical comparisons of adjoining rows. The fourth detection algorithm of the illustrated embodiment first performs three similar operations: the summation of the A3, A4, A5 pixel values minus the summation of the B3, B4, B5 pixel values (step 114), the summation of the D3, D4, D5 pixel values minus the summation of the E3, E4, E5 pixel values (step 116), and the summation of the F3, F4, F5 pixel values minus the summation of the G3, G4, G5 pixel values (step 118). The absolute values of the results of those three operations are then summed together to form a first interim result (step 120). The second part of the fourth detection algorithm performs horizontal comparisons of adjoining columns. The algorithm performs three similar operations: the summation of the C1, D1, E1 pixel values minus the summation of the C2, D2, E2 pixel values (step 122), the summation of the C4, D4, E4 pixel values minus the summation of the C5, D5, E5 pixel values (step 124), and the summation of the C6, D6, E6 pixel values minus the summation of the C7, D7, E7 pixel values (step 126). The absolute values of the results from the three operations are summed together to form a second interim result (step 128). The two interim results are compared, and the final result is set to be equal to the larger interim result (step 130).

Figure 10A:
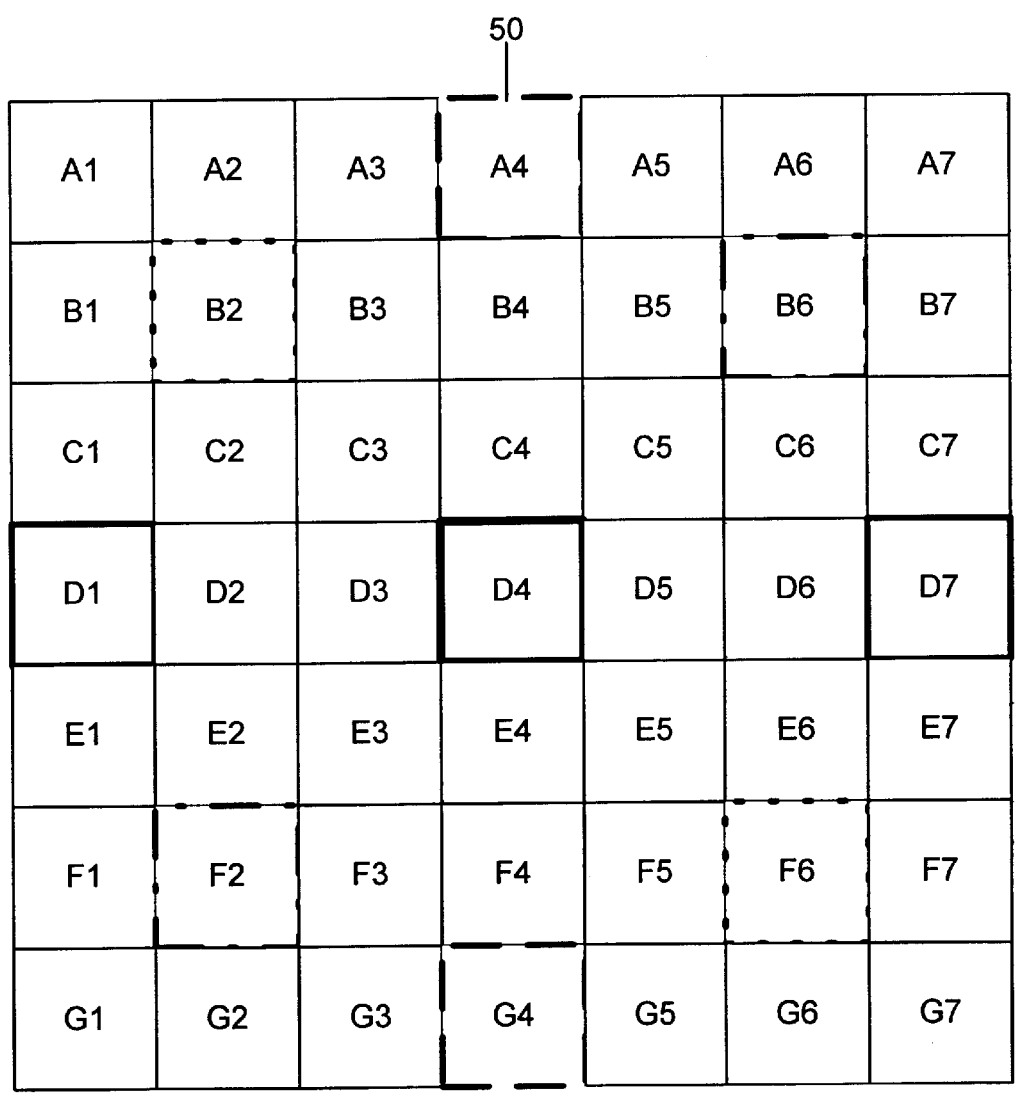
FIG. 10A is a block diagram of the 7×7 pixel window of FIG. 5 depicting the comparison pixels of a fifth detection algorithm.
Figure 10B:
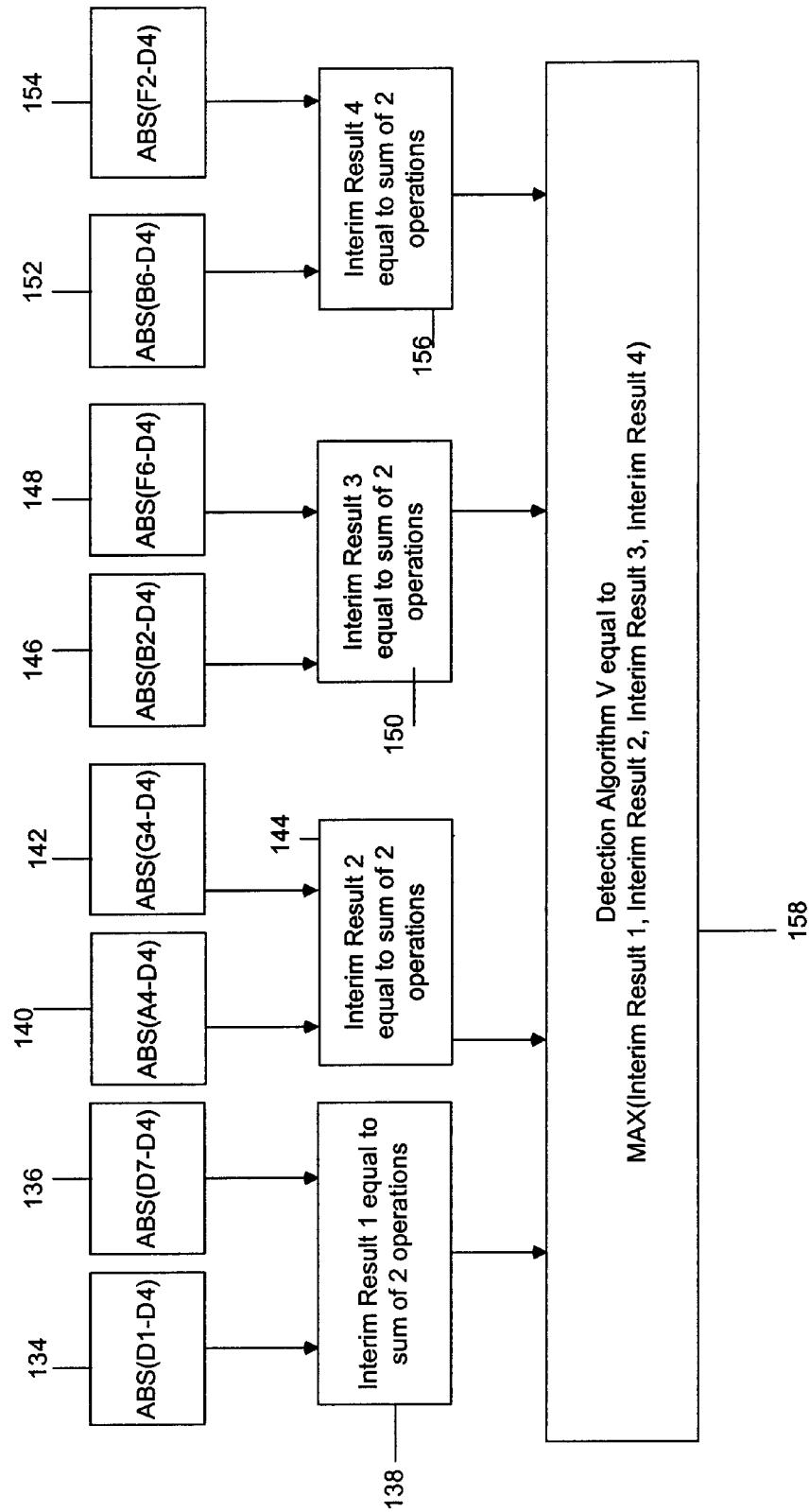
FIG. 10B is a flow chart of the steps performed by the fifth detection algorithm in the illustrative embodiment of the present invention.

A fifth detection algorithm used by the illustrated embodiment of the present invention detects the probable presence of photographic image data. FIG. 10A depicts a 7×7 pixel window 50 which denotes the pixels being utilized by a fifth detection algorithm. FIG. 10B illustrates the steps taken by a fifth detection algorithm. The first step is the subtraction of the center D4 pixel value from the D1 pixel value (step 134). The algorithm next subtracts the D4 pixel value from the D7 pixel value (step 136). The absolute values of the two results are then added together to form a first interim result (step 138). The algorithm subtracts the D4 pixel value from the A4 pixel value (step 140), calculates the G4 pixel value minus the D4 pixel value (step 142), and then adds the absolute values of the two results to generate a second interim result (step 144).

The fifth detection algorithm next performs diagonal comparisons. The algorithm initially subtracts the D4 pixel value from the B2 pixel value (step 146). The algorithm takes the value of the F6 pixel value minus the D4 pixel value (step 148) and adds the absolute values of the two results together to arrive at a third interim result (step 150). The algorithm also takes the absolute value of the B6 pixel minus the D4 pixel (step 152), takes the value of the F2 pixel minus the D4 pixel value (step 154) and adds the absolute values of the two results together to arrive at a fourth interim result (step 156). The first, second, third and fourth interim results are compared and the largest becomes the output/result of the fifth detection algorithm (step 158).

Figure 11:
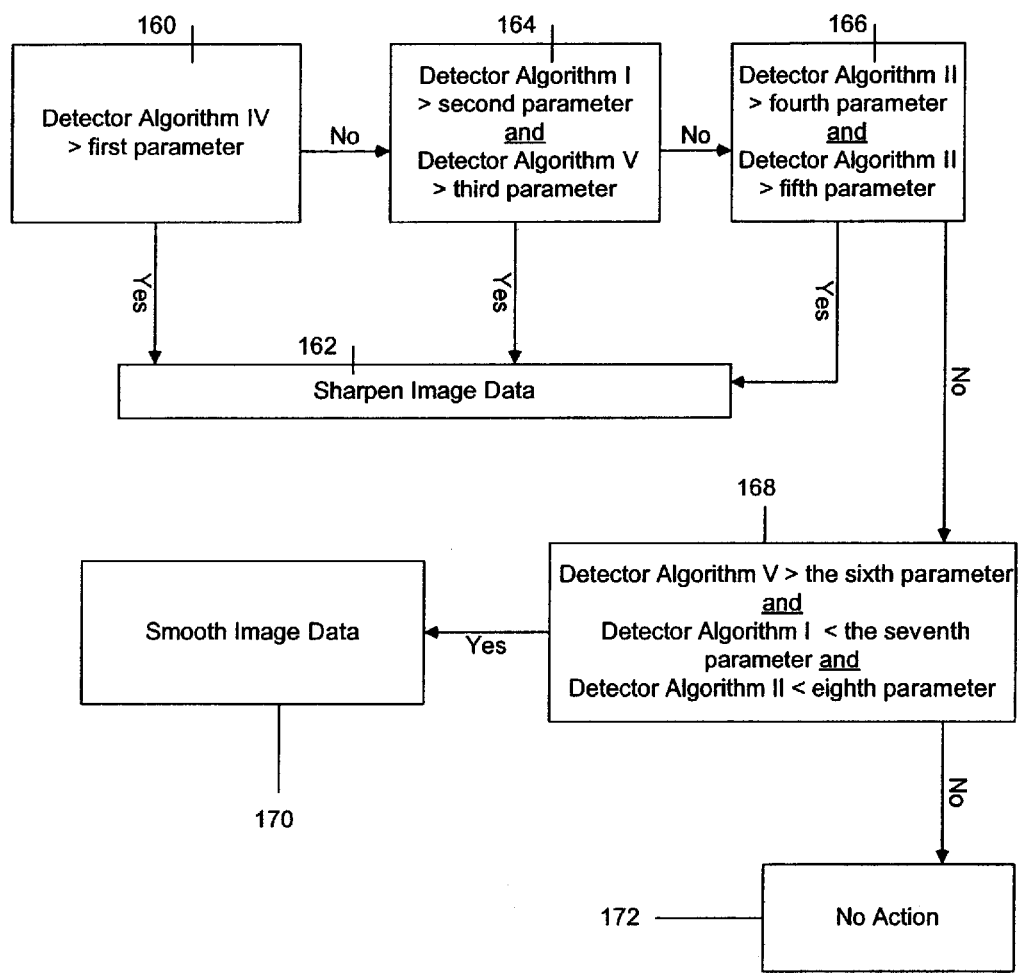
FIG. 11 is a flow chart depicting the steps taken by the illustrative embodiment of the present invention following the execution of the detection algorithms.

Once the detection algorithms have been run, the next step in the illustrated embodiment of the present invention (see FIG. 11), is to interpret the results of the detection algorithms. The results of the detection algorithms are compared to predefined parameters. The parameters represent boundary values for the detection algorithm results. The boundary values are based on analysis of data contained in different types of image regions. For example, analysis of halftone image data has revealed that the first detection algorithm should produce a result close to 0 if applied to data from a halftone region. A number close to 0 is therefore set as a parameter value. The fourth detection algorithm result (step 130), which was used to search for the probable presence of the text character "=", is compared to the first parameter (step 160). If the fourth detection algorithm result (step 130) is greater than the first parameter then the image data needs to be sharpened (step 162) as the probable presence of text image data has been detected. If the fourth detection algorithm result is not greater than a first parameter, the first detection algorithm result (step 76), which was used to search for the probable presence of halftone and large text, is analyzed to see if the result of the first detection algorithm is greater than a second parameter. In addition, the fifth detection algorithm result (step 158), which was used to search for the probable presence of photographic image data, is analyzed to see if it the result of the fifth detection algorithm is greater than a third parameter (step 164). If both conditions are met, the image data needs to be sharpened (step 162) as the probable presence of text image data has been detected. If both conditions are not met, then the illustrated embodiment of the present invention checks whether the second detection algorithm result, which was used to search for the probable presence of small text, is greater than a fourth parameter and a fifth parameter (step 166). If both conditions are met, then the image data will be sharpened (step 162) as the probable presence of text image data has been detected.

If the detection algorithms do not indicate the presence of a text image region, a first check is performed to see if the fifth detection algorithm result (step 158), which was used to search for the probable presence of photographic image data, is greater than a sixth parameter. A second check is performed to determine the result of the first detection algorithm (step 76), which was used to look for the probable presence of halftone or large text, is less than a seventh parameter, and a third check is performed to determine if the second detection algorithm result, which was used to search for the probable presence of small text data, is less than an eighth parameter (step 168). If all three checked conditions are met, then the image data will be smoothed (step 170), as the detection algorithms indicate the probable presence of halftone image data. If the image data is neither smoothed nor sharpened, the illustrative embodiment of the present invention takes no action on the image data on the basis of the detection algorithms results (step 172), as the detection algorithms indicate the likely presence of photographic image data.

The illustrative embodiment of the present invention allows scanned image data with a resolution of 600 dpi to be efficiently processed. The present invention allows the processing of different types of scanned image data and is applicable to any electronic device processing a flow of scanned image data with a resolution of 600 dpi. The invention efficiently attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that in certain cases, the sequence of the detection algorithm computations may be adjusted without affecting the particular algorithm's result and without departing from the scope of the present invention.

While the present invention has been described with reference to an illustrative embodiment, those skilled in the art will appreciate that various changes in form and detail may be made without departing from the intended scope of the present invention as defined in the appended claims.

We claim:

1. A method of processing image data containing pixel values for pixels wherein said image data has a resolution of at least 600 dpi, said method comprising the steps of:

positioning a pixel window over a subset of pixels in the image data, said pixel window surrounding a focus pixel; and performing calculations on pixel values of pixels in the pixel window to detect image type, said calculations distinguishing between a region containing large text image data and a region containing halftone image data, and wherein the performing of calculations further comprises the steps of:

summing the pixel values of a first, second, third and fourth subset of pixels in said pixel window to form a respective first, second, third and fourth cumulative pixel value; subtracting said third cumulative pixel value from the first cumulative pixel value and the fourth cumulative pixel value from the second cumulative pixel value to produce respective results, the larger of the respective results being designated as an overall result, and comparing said overall result to previously obtained results for a region known to contain halftone image data and a region known to contain large text image data, to predict a likelihood of the pixel being examined belonging to a halftone image region or large text image region.

2. The method of claim 1, based on whether it is detected that the region contains large text image data or that the region contains halftone image data, modifying the pixel value of the focus pixel.

3. The method of claim 1 wherein the method further comprises the steps of:

sliding the pixel window so that it lies over a different subset of pixels in the image data and has a different focus pixel; and performing calculations on pixel values of pixels in the different subset of pixels to determine whether the different focus pixel is in a region containing large text image data or a region containing halftone image data.

4. A method of processing image data containing pixel values for pixels wherein said image data has a resolution of at least 600 dpi, said method comprising the steps of:

positioning a pixel window over a subset of pixels in the image data, said pixel window divided into four equal sized quadrants surrounding a focus pixel being examined in said pixel window, said quadrants being oriented so as to have two upper quadrants and two lower quadrants and each upper quadrant having a corresponding lower quadrant that is diagonally positioned relative to the upper quadrant;

performing calculations on pixel values of pixels in the pixel window to detect whether the focus pixel in the pixel window is in a region containing large text image data or a region containing halftone image data, and wherein the performing of calculations further comprises the steps of:

summing the pixel values for the pixels in each said quadrant to form a cumulative quadrant pixel value; and subtracting said cumulative quadrant pixel value for each lower quadrant from the cumulative quadrant pixel values of the diagonally positioned upper quadrant to produce respective results, and designating the larger of the results as the result of said image detection algorithm, and comparing said result to previously obtained results for a region known to contain halftone image data and a region known to contain large text image data, to predict a likelihood of the pixel being examined belonging to a halftone image region or large text image region.

5. A method of processing image data containing pixel values for pixels wherein said image data has a resolution of at least 600 dpi, said method comprising the steps of: positioning a pixel window over a subset of pixels in the image data, said pixel window surrounding a focus pixel; and performing calculations on pixel values of pixels in the pixel window to detect image type, said calculations distinguishing between a region containing small text image data and a halftone image region, comparing the pixel values of the corner pixels of said pixel window to the value of said focus pixel so as to compare differences of pixel values between the focus pixel of the pixel window and the corner pixels at the corners of said pixel window to produce a first result; and comparing corner pixel values for pixels positioned in corners of a smaller pixel window, said smaller pixel window forming a subset of the first pixel window, to the value of said focus pixel to compare differences in pixel values between the focus pixel and the corner pixels at the corners of said slightly smaller pixel window to produce a second result; and comparing said first result and said second result to previously obtained results for a region known to contain small text image data, to predict a likelihood of the pixel being examined belonging to a small text image region.

6. The method of claim 5, based on whether it is detected that the region contains small text, modifying the pixel value of the focus pixel.

7. The method of claim 5 wherein the method further comprises the steps of:

sliding the pixel window so that it lies over a different subset of pixels in the image data and has a different focus pixel; and performing calculations on pixel values of pixels in the different subset of pixels to determine whether the different focus pixel is in a region containing small text image data.

8. A method of processing image data containing pixel values for pixels wherein said image data has a resolution of at least 600 dpi, said method comprising the steps of:

positioning a pixel window which surrounds a focus pixel over a subset of pixels in the image data, said pixel window being having four equal length sides joined together, a top side, a bottom side, a right side and a left side, corner pixels being located at the intersection of said top side and said right side, the intersection of said top side and said left side, the intersection of said bottom side and said left side, and the intersection of said bottom side and said right side;

performing calculations on pixel values of pixels in the pixel window to detect whether the focus pixel in the pixel window is in a region containing small text image data, and wherein the performing of calculations further comprises the steps of:

comparing the pixel values of the corner pixels of said pixel window to the value of said focus pixel so as to compare differences of pixel values between the focus pixel of the pixel window and the corner pixels at the corners of said pixel window to produce a first result; and comparing corner pixel values for pixels positioned in corners of a slightly smaller pixel window, forming a subset of the first pixel window to the value of said focus pixel to compare differences in pixel values between the focus pixel and the corner pixels at the corners of said slightly smaller pixel window to produce a second result; and comparing said first result and said second result to previously obtained results for a region known to contain small text image data, to predict a likelihood of the pixel being examined belonging to a small text image region.

9. A method of processing image data containing pixel values for pixels wherein said image data has a resolution of at least 600 dpi, said method comprising the steps of:

positioning a pixel window over a subset of pixels in the image data, said pixel window surrounding a focus pixel; and performing calculations on pixel values of pixels in the pixel window to detect whether the focus pixel in the pixel window is in a region containing the text character 'x' or a region containing the text character '='.

10. The method of claim 9, based on whether it is detected that the region contains the text character 'x' or that the region contains the text character '=', modifying the pixel value of the focus pixel.

11. The method of claim 9 wherein the method further comprises the steps of:

sliding the pixel window so that it lies over a different subset of pixels in the image data and has a different focus pixel; and performing calculations on pixel values of pixels in the different subset of pixels to determine whether the different focus pixel is in a region containing the text character 'x' or a region containing the text character '='.

12. The method of claim 9, wherein the performing of calculations further comprises the steps of:

comparing the pixel values of a subset of pixels in the pixel window indicative of text character 'x' and text character '=' with the focus pixel of said pixel window so as to compare differences of pixel values between the focus pixel and the subset of pixels in the pixel window indicative of the text character 'x' and the text character '='; and relating the result of said comparing to previously obtained results for a region known to contain the text character 'x' image area, and a region known to contain the text character '=', to predict a likelihood of the pixel being examined belonging to a region containing the text character 'x' or a region containing the text character '='.

13. A method of processing image data containing pixel values for pixels wherein said image data has a resolution of at least 600 dpi, said method comprising the steps of:

positioning a pixel window over a subset of pixels in the image data, said pixel window surrounding a focus pixel; and performing calculations on pixel values of pixels in the pixel window to detect whether the focus pixel in the pixel window is in a region containing the text character '='.

14. The method of claim 13, based on whether it is detected that the region contains the text character '=', modifying the pixel value of the focus pixel.

15. The method of claim 13 wherein the method further comprises the steps of:

sliding the pixel window so that it lies over a different subset of pixels in the image data and has a different focus pixel; and performing calculations on pixel values of pixels in the different subset of pixels to determine whether the different focus pixel is in a region containing the text character '='.

16. The method of claim 13, wherein the performing of calculations further comprises the steps of:
- comparing the pixel values of a subset of pixels in the pixel window indicative of text character '=' with the focus pixel of said pixel window so as to compare differences of pixel values between the focus pixel and the subset of pixels in the pixel window indicative of the text character '='; and
- relating the result of said comparison to previously obtained results for a region known to contain the text character '=', to predict a likelihood of the pixel being examined belonging to a region containing the text character '='.

17. A method of processing image data containing pixel values for pixels wherein said image data has a resolution of at least 600 dpi, said method comprising the steps of:
- positioning a pixel window surrounding a focus pixel over a subset of pixels in the image, said pixel window being composed of horizontally oriented rows and vertically oriented columns of pixels, said pixel window containing pixels horizontally oriented relative to the focus pixel, said focus pixel also containing pixels vertically oriented to the focus pixel, said pixel window further containing pixels diagonally oriented to the focus pixel, said pixels forming a first diagonal relative to the focus pixel and a second diagonal relative to the focus pixel;
- performing calculations on pixel values of pixels in the pixel window to detect whether the focus pixel in the pixel window is in a region containing photographic image data, and wherein the step of performing calculations further comprises the steps of:
  - comparing pixel values of a subset of the pixels horizontally oriented relative to said focus pixel to the pixel value of said focus pixel so as to compare differences of pixel values between the focus pixel of the pixel window and the subset of pixels horizontally oriented to form a first result; and
  - comparing pixel values of a subset of the pixels vertically oriented relative to said focus pixel to the pixel value of said focus pixel so as to compare differences of pixel values between the focus pixel of the pixel window and the subset of pixels vertically oriented to form a second result; and
  - comparing pixel values of a first subset of the pixels diagonally oriented relative to said focus pixel to the pixel value of said focus pixel so as to compare differences of pixel values between the focus pixel of the pixel window and the first subset of pixels diagonally oriented to form a third result; and
  - comparing pixel values of a second subset of the pixels diagonally oriented relative to said focus pixel to the pixel value of said focus pixel so as to compare differences of pixel values between the focus pixel of the pixel window and the second subset of pixels diagonally oriented pixels to form a fourth result; and
  - comparing said first, second, third and fourth results to previously obtained results for a region known to contain photographic image data, to predict a likelihood of the focus pixel belonging to a region containing photographic image data.

18. A method of processing image data containing pixel values for pixels wherein said image data has a resolution of 600 dpi, said method comprising the steps of:
- positioning a pixel window surrounding a pixel over a subset of pixels in the image data, said pixel window surrounding a focus pixel; and
- performing calculations on pixel values of pixels in the pixel window to detect whether the focus pixel in the pixel window is in a region containing large text image data, or a region containing halftone image data, or in a region containing small text image data, or in a region containing photographic image data, wherein the performing of calculations generates results which are then compared to previously obtained results for a known region of halftone image data, compared to results for a known region of large text image image data, compared to results for a known region of small text image data, and compared to results for a known area of photographic image, to predict a likelihood of the pixel being examined belonging to a halftone image region or large text image region, a small text image region or a photographic image region.

19. The method of claim 18, based on whether it is detected that the region contains large text image data, or the region contains halftone image data, or the region contains small text image data, or a region contains photographic image data, modifying the pixel value of the focus pixel.

20. The method of claim 18 wherein the method further comprises the steps of:
- sliding the pixel window so that it lies over a different subset of pixels in the image data and has a different focus pixel; and
- performing calculations on pixel values of pixels in the different subset of pixels to determine whether the different focus pixel is in a region containing large text image data, in a region containing halftone image data, in a region containing small text image data, or in a region containing photographic image data.

21. The method of claim 18 wherein said pixel window measures 7 pixels by 7 pixels.

22. A medium holding computer-executable instructions for performing a method of processing image data containing pixel values for pixels wherein said image data has a resolution of 600 dpi, said method comprising the steps of:
- positioning a pixel window over a subset of pixels in the image data, said pixel window surrounding a focus pixel; and
- performing calculations on pixel values of pixels in the pixel window to detect whether the focus pixel in the pixel window is in a region containing large text image data, or in a region containing halftone image data, or in a region containing small text image data, or in a region containing photographic image data, and wherein the performing said calculations generates results which are then compared to previously obtained results for a known region of halftone image data, a known region of large text image data, a known region of small text image data, and a known region of photographic image data, to predict a likelihood of the focus pixel belonging to a halftone image region, or to a large text image region, or to a small text image region, or to a photographic image region.

23. The medium of claim 22, said method further comprising:
- modifying the pixel value of the pixel focus based on whether it is detected that the region contains large text image data, or the region contains halftone image data, or the region contains small text image data, or the region contains photographic image data.

24. The medium of claim 22, said method further comprising:
- sliding the pixel window so that it lies over a different subset of pixels in the image data and has a different focus pixel; and performing calculations on pixel values of pixels in the different subset of pixels to determine whether the different focus pixel is in a region containing large text image data, in a region containing halftone image data, in a region containing small text image data, or in an area containing photographic image data.

25. The medium of claim 22 wherein said method uses a pixel window that measures 7 pixels by 7 pixels.

26. In an electronic device, a medium holding executable steps for a method of processing image data containing pixel values for pixels wherein said image data has a resolution of at least 600 dpi, said method comprising the steps of:

positioning a pixel window over a subset of pixels in the image data, said pixel window divided into four equal sized quadrants surrounding a focus pixel being examined in said pixel window, said quadrants being oriented so as to have two upper quadrants and two lower quadrants and each upper quadrant having a corresponding lower quadrant that is diagonally positioned relative to the upper quadrant;

performing calculations on pixel values of pixels in the pixel window to detect whether the focus pixel in the pixel window is in a region containing large text image data or a region containing halftone image data, and wherein the performing of calculations further comprises the steps of:

summing the pixel values for the pixels in each said quadrant to form a cumulative quadrant pixel value; and subtracting said cumulative quadrant pixel value for each lower quadrant from the cumulative quadrant pixel values of the diagonally positioned upper quadrant to produce respective results, and designating the larger of the results as the result of said image detection algorithm, and comparing said result to previously obtained results for a region known to contain halftone image data and a region known to contain large text image data, to predict a likelihood of the pixel being examined belonging to a halftone image region or large text image region.

27. In an electronic device, a medium holding executable steps for a method of processing image data containing pixel values for pixels wherein said image data has a resolution of at least 600 dpi, said method comprising the steps of:

positioning a pixel window which surrounds a focus pixel over a subset of pixels in the image data, said pixel window being having four equal length sides joined together, a top side, a bottom side, a right side and a left side, corner pixels being located at the intersection of said top side and said right side, the intersection of said top side and said left side, the intersection of said bottom side and said left side, and the intersection of said bottom side and said right side;

performing calculations on pixel values of pixels in the pixel window to detect whether the focus pixel in the pixel window is in a region containing small text image data, and wherein the performing of calculations further comprises the steps of:

comparing the pixel values of the corner pixels of said pixel window to the value of said focus pixel so as to compare differences of pixel values between the focus pixel of the pixel window and the corner pixels at the corners of said pixel window to produce a first result; and comparing corner pixel values for pixels positioned in corners of a slightly smaller pixel window, forming a subset of the first pixel window to the value of said focus pixel to compare differences in pixel values between the focus pixel and the corner pixels at the corners of said slightly smaller pixel window to produce a second result; and comparing said first result and said second result to previously obtained results for a region known to contain small text image data, to predict a likelihood of the pixel being examined belonging to a small text image region.

28. In an electronic device, a medium holding executable steps for a method of processing image data containing pixel values for pixels wherein said image data has a resolution of at least 600 dpi, said method comprising the steps of:

positioning a pixel window surrounding a focus pixel over a subset of pixels in the image, said pixel window being composed of horizontally oriented rows and vertically oriented columns of pixels, said pixel window containing pixels horizontally oriented relative to the focus pixel, said focus pixel also containing pixels vertically oriented to the focus pixel, said pixel window further containing pixels diagonally oriented to the focus pixel, said pixels forming a first diagonal relative to the focus pixel and a second diagonal relative to the focus pixel;

performing calculations on pixel values of pixels in the pixel window to detect whether the focus pixel in the pixel window is in a region containing photographic image data, and wherein the step of performing calculations further comprises the steps of:

comparing pixel values of a subset of the pixels horizontally oriented relative to said focus pixel to the pixel value of said focus pixel so as to compare differences of pixel values between the focus pixel of the pixel window and the subset of pixels horizontally oriented to form a first result; and comparing pixel values of a subset of the pixels vertically oriented relative to said focus pixel to the pixel value of said focus pixel so as to compare differences of pixel values between the focus pixel of the pixel window and the subset of pixels vertically oriented to form a second result; and comparing pixel values of a first subset of the pixels diagonally oriented relative to said focus pixel to the pixel value of said focus pixel so as to compare differences of pixel values between the focus pixel of the pixel window and the first subset of pixels diagonally oriented to form a third result; and comparing pixel values of a second subset of the pixels diagonally oriented relative to said focus pixel to the pixel value of said focus pixel so as to compare differences of pixel values between the focus pixel of the pixel window and the second subset of pixels diagonally oriented pixels to form a fourth result; and comparing said first, second, third and fourth results to previously obtained results for a region known to contain photographic image data, to predict a likelihood of the focus pixel belonging to a region containing photographic image data.

29. In an electronic device, a medium holding executable steps for a method of processing image data containing pixel values for pixels wherein said image data has a resolution of at least 600 dpi, said method comprising the steps of:

positioning a pixel window over a subset of pixels in the image data, said pixel window surrounding a focus pixel; and performing calculations on pixel values of pixels in the pixel window to detect whether the focus pixel in the pixel window is in a region containing the text character 'x' or a region containing the text character '='.

30. The medium of claim 29, wherein, based on whether it is detected that the region contains the text character 'x' or that the region contains the text character '=', pixel value of the focus pixel is modified.

31. The medium of claim 29 wherein the method further comprises the steps of:
   sliding the pixel window so that it lies over a different subset of pixels in the image data and has a different focus pixel; and
   performing calculations on pixel values of pixels in the different subset of pixels to determine whether the different focus pixel is in a region containing the text character 'x' or a region containing the text character '='.

32. The medium of claim 29, wherein the performing of calculations further comprises the steps of:
   comparing the pixel values of a subset of pixels in the pixel window indicative of text character 'x' and text character '=' with the focus pixel of said pixel window so as to compare differences of pixel values between the focus pixel and the subset of pixels in the pixel window indicative of the text character 'x' and the text character '='; and
   relating the result of said comparing to previously obtained results for a region known to contain the text character 'x' image area, and a region known to contain the text character '=', to predict a likelihood of the pixel being examined belonging to a region containing the text character 'x' or a region containing the text character '='.

33. In an electronic device, a medium holding executable steps for a method of processing image data containing pixel values for pixels wherein said image data has a resolution of at least 600 dpi, said method comprising the steps of:
   positioning a pixel window over a subset of pixels in the image data, said pixel window surrounding a focus pixel; and
   performing calculations on pixel values of pixels in the pixel window to detect whether the focus pixel in the pixel window is in a region containing the text character '='.

34. The medium of claim 33, based on whether it is detected that the region contains the text character '=', modifying the pixel value of the focus pixel.

35. The medium of claim 33, wherein the method further comprises the steps of:
   sliding the pixel window so that it lies over a different subset of pixels in the image data and has a different focus pixel; and
   performing calculations on pixel values of pixels in the different subset of pixels to determine whether the different focus pixel is in a region containing the text character '='.

36. The medium of claim 33, wherein the performing of calculations further comprises the steps of:
   comparing the pixel values of a subset of pixels in the pixel window indicative of text character '=' with the focus pixel of said pixel window so as to compare differences of pixel values between the focus pixel and the subset of pixels in the pixel window indicative of the text character '='; and
   relating the result of said comparison to previously obtained results for a region known to contain the text character '=', to predict a likelihood of the pixel being examined belonging to a region containing the text character '='.

* * * * *